Figure 1:
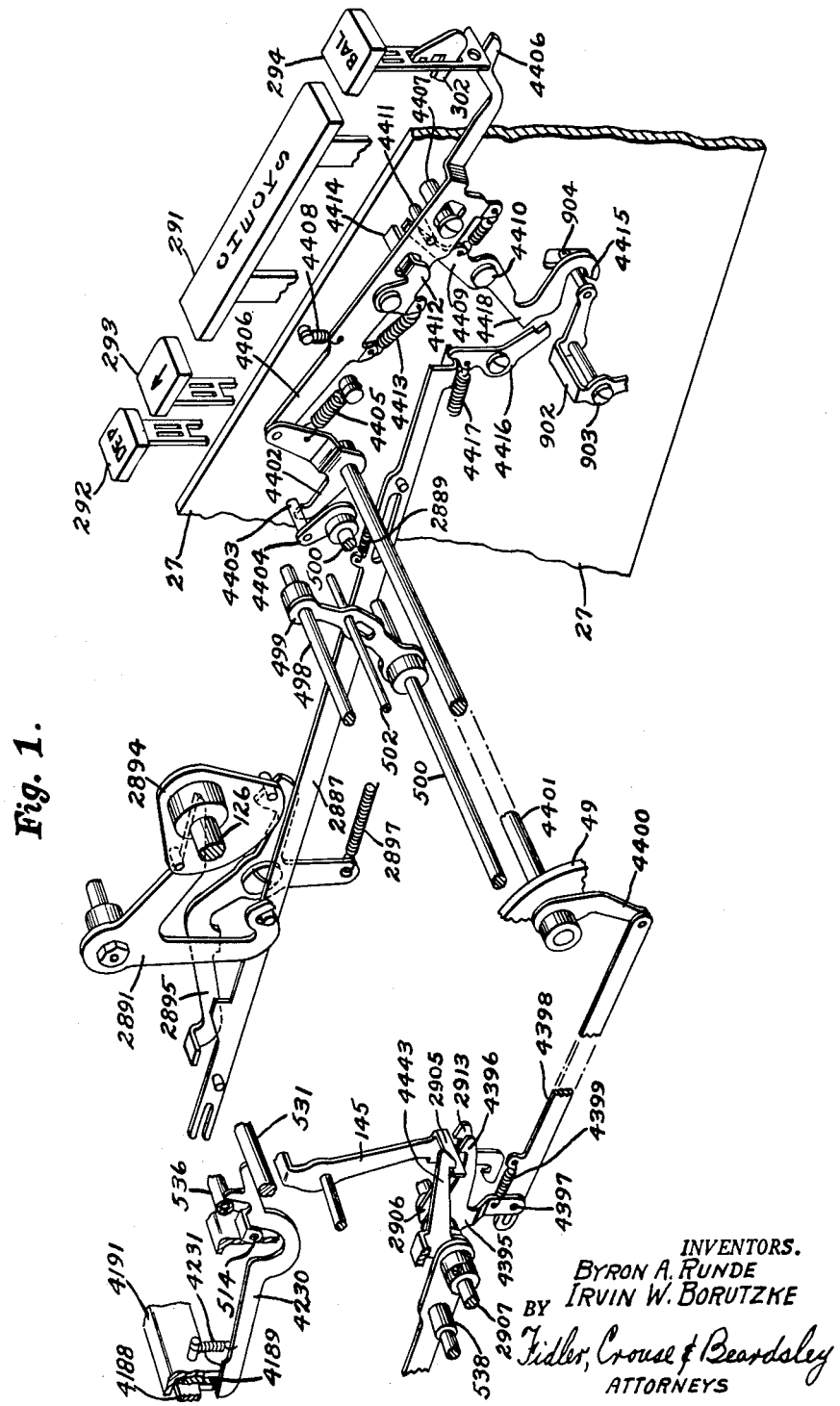

March 6, 1962   B. A. RUNDE ETAL   3,023,951
CONTROL APPARATUS FOR ACCOUNTING MACHINES
Original Filed July 18, 1955

INVENTORS.
BYRON A. RUNDE
IRVIN W. BORUTZKE
BY Fidler, Crouse & Beardsley
ATTORNEYS

United States Patent Office 3,023,951
Patented Mar. 6, 1962

3,023,951
CONTROL APPARATUS FOR ACCOUNTING MACHINES
Byron A. Runde, Farmington, and Irvin William Borutzke, Detroit, Mich., assignors to Burroughs Corporation, Detroit, Mich., a corporation of Michigan
Original application July 18, 1955, Ser. No. 522,430. Divided and this application Jan. 30, 1957, Ser. No. 637,281
2 Claims. (Cl. 235—60.47)

This invention relates to improvements in accounting machines and is concerned more particularly with improvements in the control of machine operation by the totalizer in cooperation with the carriage and/or selected ones of the keys.

In some kinds of accounting or bookkeeping work, such for example as the posting of checking accounts in banks, it is desired that the accounting machine provide a warning to the operator when an overdraft or negative balance is present in the totalizer immediately following the posting of checks. Such a warning may direct the operator's' attention to a situation which might pass unnoticed if the operator were permitted to proceed with the posting of deposits without such warning. In particular it may serve to apprise the operator of attempted perpetration of certain objectionable commercial practices which are described in detail below. In accordance with one embodiment of the invention such a warning is provided in the form of a restraint upon operation of the machine following the posting of the checks and movement of the paper carriage to the deposit column. The resulting failure of the machine to operate under the influence of the conventional controls apprises the operator that there is a negative balance in the totalizer.

It is another object of the present invention to provide an improved control of machine operation whereby cycling of the machine by actuation of the usual manipulative means is prevented when the carriage is in certain predetermined columnar positions and there is a negative total balance in the totalizer.

The foregoing and other features of the invention are hereinafter more particularly described with reference to the accompanying drawings in which:

FIGURE 1 is a perspective of a crossfooter negative total lock controlled by the lowermost motor bar.

*General*

The invention is herein disclosed as embodied, by way of example, in an accounting machine constructed as disclosed in Patent No. 2,629,549 issued Feb. 24, 1953, to Thomas M. Butler with the modifications disclosed in application Serial No. 242,623 filed Aug. 20, 1951, by Byron A. Runde, which matured into Patent 2,807,412 on Sept. 24, 1957, and with further modifications disclosed in application Serial No. 522,430 of which the present application is a division. The above three cases are referred to subsequently herein as the Butler patent, the Runde application, and the parent application.

Those elements of the illustrated machine which are disclosed in prior patents or applications are designated in the following description and accompanying drawings by the same reference numbers by which they are identified in such prior patents and applications. Mechanisms, parts and elements newly disclosed in the parent application are designated by reference numbers above 4100.

Consistently with the descriptions in the above-mentioned Butler patent and Runde application, the terms "clockwise" and "counterclockwise" will be applied to rotary or swinging movements of parts as viewed from the front, top, or right side of the machine, and the terms "forward," "rearward," "rightward," "leftward," "upward" and "downward" will be applied to movements or positions of the parts as viewed normally from the front of the machine.

The machine is cyclically operable by a drive means comprising the main drive shaft 126 (FIG. 1) which is driven by an electric motor (not shown) through a one revolution clutch (not shown) controlled by a lever 145 (FIG. 1) in such manner, as disclosed in detail in said Butler patent, that the machine is driven through a cycle of operation each time the lower end of the cycling control lever 145 is moved forwardly from its normal position. In the latter part of each cycle, the lever 145 is returned to its normal position.

The manual and automatic function controls of the machine are like those of the Butler patent modified as disclosed in the Runde application and further modified as described in detail in the parent application and hereinafter.

*Crossfooter Negative Total Lock*

In some kinds of work, such as posting checking accounts in bank bookkeeping, it is desirable to prevent the new balance total-taking operation and thereby notify the machine operator when an overdraft or negative balance is present in the amount section of the A crossfooter. However, the negative total lock should not be effective to prevent the subtotal-taking operation of the crossfooter in completing a listing of a group of items with the carriage in the listing columnar position or to prevent the repeat subtotal operation in the item columnar position where the items are subtractively entered in the crossfooter which will, therefore, contain a negative sum.

The lane 3 control, used in combination with either the lane 15 control or the lane 20 control (described in the parent application), may be set to produce movement of the paper carriage directly to the new balance columnar position in any machine cycle initiated by depression of the lowermost motor bar 294. In the present machine the paper carriage is automatically moved from columnar position to columnar position by the means disclosed in the previously mentioned Butler patent, said carriage moving means being controlled by the motor bars, by certain of the automatic function control lanes, and by other means, all as fully disclosed in the said Butler patent. In the balance columnar position by means of the lane 6 control, the A crossfooter controls may be conditioned automatically for total-taking. By means of the lane 18 control, as disclosed in the Butler patent, the release of the small motor bar latch means 302 may be prevented so that the bar 294 will remain latched down to initiate automatically a machine cycle with the carriage in the balance columnar position. In the present machine, an interlock is operated by means conditioned by the lowermost motor bar 294 when it is depressed and held down beyond the end of the machine cycle for control by the crossfooter in accordance with the sign of the balance therein to prevent the initiation of a further machine cycle by the holding down of that motor bar when the balance is negative.

A further latch bell crank 4395 is now rockably supported on the shaft 2907 leftwardly of the latch arm 2906 secured thereto. The latch arm 2906, as disclosed in the first-mentioned Runde application, prevents initiation of a machine cycle until the multiple register pinion assembly has returned to its #1 register position from any other register selecting position it occupied in a preceding machine cycle. A forward arm of the latch crank 4395 has a latch shoulder 4396 normally located just forwardly of and below the latch lug 2905 on the machine cycling control lever 145. The lower arm of the bell crank 4395 carries a stud 4397 embraced in an elongated slot in the rearward end of a link 4398 and is also connected with said link through a tension spring 4399 which normally holds the stud 4397 in the forward end of the slot in the link 4398. The forward end of the link 4398 is pivotally connected to the lower end of an arm 4400 secured on the left end of a shaft 4401 which is journaled in the brace members 49 and in the right hand frame plate 27. A bell crank 4402, secured to the rightward portion of the shaft 4401 on the left side of the plate 27, has a rearward arm extending under a stud 4403 carried by an arm 4404 secured to and extending rearwardly from the shaft 500 which, in each machine cycle, rocks to swing the bail 498 first rearwardly and later forwardly to normal position to effect the excursions of the stop slides 483. The bell crank 4402 is urged counterclockwise by a tension spring 4405 and its upper arm is pivotally connected to the rearward end of a link 4406. A stud 4407 secured in the frame plate 27 extends leftwardly through an aperture in the forward portion of the link, the aperture being of such size and form as to permit necessary upward and downward as well as rearward and forward motion of the forward portion of said link 4406 which extends under the stem of the lowermost motor bar 294. A tension spring 4408 yieldingly holds the link 4406 upwardly. The upward arm of a two-armed lever 4409 pivotally supported on a stud 4410 secured in the plate 27 terminates just rearwardly of a stud 4411 secured in and projecting rightwardly from the link 4406. A latch pawl 4412 pivoted on a stud in the leftward side of the link 4406 and urged counterclockwise by a tension spring 4413 has on its forward arm a lug 4414 extending rightwardly through an aperture in the link 4406 and located just rearwardly of and normally higher than the end of the upper arm of the lever 4409. The lower arm of the lever 4409 is formed with a rearwardly open notch which normally embraces the stud 904 which is controlled, in the manner disclosed in the Butler patent, by portions of the "fugitive 1" mechanism in accordance with the algebraic sign of the total contained in the amount section of the crossfooter. While that total is positive, the stud 904 is in its upper position in alignment with the notch in the lower arm of the lever 4409, but when the accumulated balance in the cross footer becomes negative the stud 904 is moved downwardly to a position in alignment with a rearward projection 4415 of the lower arm of the lever 4409 below the notch.

A detent lever 4416 pivotally mounted on a stud in the plate 27 is urged clockwise by a tension spring 4417 and has an upper arm normally engaged by the forward end of the control slide 2887 which is moved rearwardly at the beginning of each machine cycle, and is again returned forwardly at the very end of the machine cycle to trip the latch means holding the multiple register pinion assembly in selected register position, as disclosed in the first-mentioned Runde application. At the beginning of each machine cycle, the spring 4417 is therefore permitted to move the detent lever 4416 clockwise to move its lower forward latch arm toward a latch shoulder 4418 on the lower arm of the lever 4409. Except in machine cycles in which the lowermost motor bar 294 is in depressed position, the shoulder 4418 on the lever 4409 is in the path of the latch shoulder on the detent lever 4416.

As the shaft 500 and arm 4404 are rocked clockwise in each machine cycle, the stud 4403 rocks the bell crank 4402 clockwise to pull the link 4406 rearwardly so that the stud 4411 rocks the lever 4409 clockwise to move its detent shoulder 4418 forwardly of the shoulder on the detent lever 4416. Thereupon, inasmuch as the control slide 2887 has already been moved rearwardly, the spring 4417 rocks the detent lever clockwise to place its detent shoulder behind the shoulder 4418 of the lever 4409. Such rocking of the lever 4409 also moves its rearwardly projecting lower end 4415 forwardly of the stud 904. The lever 4409 is held in this latched position until the end of the machine cycle, when the slide 2887 again restores the detent lever 4416 to normal and thereby releases the lever 4409. While the lever 4409 is in its latched position during the machine cycle, the stud 904 is free to move downwardly as it will if and when the net accumulation in the crossfooter becomes negative. If the stud 904 remains in positive total position, the parts are free to restore to their normal positions at the end of the machine cycle. If, however, the stud 904 is moved downwardly to negative total position in consequence of the occurrence of an overdraft in the crossfooter, the lever 4409 is prevented from restoring to normal position.

In machine cycles in which the lowermost motor bar 294 is not depressed, the lug 4414 of the pawl 4412 remains higher than the upper end of the lever 4409 so that the link 4406 can move forwardly, and the bell crank 4402 and shaft 4401 may be rocked counterclockwise by the spring 4405 to move the link 4398 rearwardly and restore the latch bell crank 4395 to normal as the shaft 500, arm 4404 and stud 4403 return to normal. However, in machine cycles in which the lowermost motor bar 294 is in depressed position, the forward portion of the link 4406 is lower, so that the lug 4414 is behind the upper end of the arm 4409 and will remain in that position if the lowermost motor bar 294 remains latched down beyond the end of the machine cycle. Then, if the return of the lever 4409 to normal is prevented by the stud 904 being behind the rearward projection 4415 on the lower arm of the lever 4409 because of the presence of a negative balance in the crossfooter, the upper arm of the lever 4409 holds the lug 4414 and the slide 4406 in rearward position. Through the bell crank 4402, shaft 4401, arm 4400 and link 4398, the latch bell crank 4395 is then held in latching engagement with the lug 2905 of the cycling control lever 145 and prevents initiation of a further machine cycle.

In order to complete a posting operation resulting in an overdraft balance, it is necessary for the operator to depress the error key 325 (FIG. 1 of the parent application) which, as disclosed in the Butler patent, operates the small motor bar latch means 302 to release the lowermost motor bar 294, which permits the spring 4408 to elevate the forward end of the link 4406 to lift the lug 4414 clear of the upper end of the lever 4409, whereupon the spring 4405 will restore the link 4406, bell crank 4402, shaft 4401, arm 4400, link 4398 and interlock latch bell crank 4395 to normal position where the latch bell crank 4395 will not block the cycling control lever 145. The operator, after moving the paper carriage to the appropriate columnar position, may again enter on the keyboard the amount of the item which caused the balance to become overdrawn and may then depress the RT key to cause that amount to be added in the crossfooter and subtracted from the register and the count of the item to be subtracted from the count section of the crossfooter and from the count section of the register in a machine cycle initiated by a further depression of the lowermost motor bar 294. As the balance in the crossfooter amount section again becomes positive, the stud 904 returns to its upper position in line with the notch above the projection 4415 so that when the carriage again moves to the balance columnar position, the latched down motor bar 294 will automatically initiate an operation in which the positive totals will be taken from the count and amount sections of the crossfooter.

*Modes of Operation*

Let it be assumed that the operator is to post an account consisting of an old balance of $100.00 and two checks, one for $75.00 and one for $50.00. The operator posts the old balance in the pick-up column, the $75.00 check in a first check column, and then enters the amount of the $50.00 check on the keyboard. The operator, noting that there is no further entry for that account, will initiate the second check entering operation by depression of the balance bar 294 so that after the printing of the amount, i.e., $50.00, of the second check in the second check column, the paper carriage will perform a lane 3 controlled skip-tabulation to the balance columnar position where the latched-down balance bar would normally automatically initiate a balance printing operation, all as described in the parent application. However, it will be noted that the combined amounts of the two checks entered in this posting exceeds the pick-up old balance so that the crossfooter is in overdrawn condition. Consequently the previously described negative total lock will prevent the automatic initiation of the balance printing machine cycle.

In connection with this posting it will be assumed that it is the policy of the bank to permit small overdrafts in certain accounts readily identifiable by the operator, and that this posting involves such an account. In that event the operator will depress the general error key 325 which will release the latched-down balance bar 294 and permit it to restore to normal. The restoration of the balance bar 294, as previously described, permits the negative total lock to release so that upon redepression of the balance bar the machine will perform the balance printing operation to print the correct check count, i.e., 2, and the overdraft balance of $25.00

If it is the policy of the bank not to permit overdrafts, the operator may return the carriage to a check columnar position and depress the error key 325 to restore the balance bar, and then re-enter in reversed sense, that is, additively, the amount or amounts of one or more of the checks sufficient to restore a positive balance which may be printed in the normal manner.

It is believed that the foregoing example is sufficient to illustrate the advantages of the new control mechanisms of the present invention. It will, however, be readily appreciated by those skilled in the art that the disclosed machine may be used with advantage for a great variety of kinds of work and may be embodied in other equivalent forms in various accounting machines.

We claim:
1. In a cyclically operable accounting machine having a drive control means, a plurality of cycle initiating means each operable to cause said drive control means to cause the machine to be driven through a cycle of operation, and an adding and subtracting totalizer, the combination comprising a means operable to either a first or a second position and controlled by said totalizer in accordance with the algebraic sign of the total contained therein to occupy said first position while said total is of one algebraic sign but to occupy said second position while said total is of the other algebraic sign, means operable to prevent said drive control means from causing the machine to be driven through a cycle of operation, means to move said preventing means from non-preventing position to preventing position in at least each cycle of operation initiated by a predetermined one of said cycle initiating means and normally returning it to non-preventing position during an operating cycle of the machine, means controlled jointly by said predetermined one of said cycle initiating means when operated to cycle initiating position and by said totalizer-controlled means to block said preventing means from returning to said non-preventing position when said totalizer-controlled means is in a predetermined one of its two positions to thereby prevent initiation of a further cycle of operation of the machine, and manipulative means to release said preventing means for return to non-preventing position while said totalizer-controlled means remains in said second position.

2. In a cyclically operable accounting machine having a drive control means, a plurality of cycle intiating members each operable from a normal position to an operated position to cause said drive control means to cause the machine to be driven through a cycle of operation, and an adding and subtracting totalizer, the combination comprising a carriage movable to any of a plurality of positions, means controlled by said carriage and thereby rendered effective in a machine cycle initiated by operation of a predetermined one of said cycle initiating members with the carriage in a predetermined one of said positions to hold said cycle initiating member in operated position after termination of the so initiated cycle, means operable in the machine cycle to move said carriage to another of said positions, a means operable to either of two positions and controlled by said totalizer in accordance with the algebraic sign of the total contained therein to occupy one of said positions while said total is of one algebraic sign but to occupy the other of said positions while said total is of the other algebraic sign, means movable to a position to prevent said drive control means from causing the machine to be driven through a cycle of operation and to a non-preventing postion, means conditioned by said one cycle initiating member while in operated position for control by said totalizer-controlled means to locate said cycle preventing means in cycle preventing position when said totalizer-controlled means is in said one position but permit said preventing means to occupy said non-preventing position when said totalizer-controlled means is in its second position to thereby prevent initiation of a further cycle of operation of the machine while said one cycle initiating member remains in operated position and said totalizer contains a total of said one algebraic sign, and manipulative means to release said one cycle initiating member for return to normal position and said preventing means for return to non-preventing position while said totalizer-controlled means remains in said one position.

References Cited in the file of this patent

UNITED STATES PATENTS

| | | |
|---|---|---|
| 2,229,834 | Anderson | Jan. 28, 1941 |
| 2,274,803 | Muller | Mar. 3, 1942 |
| 2,526,734 | Davidson et al. | Oct. 24, 1950 |
| 2,626,749 | Christian et al. | Jan. 27, 1953 |
| 2,813,611 | Frieberg et al. | Nov. 19, 1957 |
| 2,838,231 | Konrad et al. | June 10, 1958 |

Disclaimer 3,023,951.—*Byron A. Runde*, Farmington, and *Irvin William Borutzke*, Detroit, Mich. CONTROL APPARATUS FOR ACCOUNTING MACHINES. Patent dated Mar. 6, 1962. Disclaimer filed July 11, 1962, by the assignee, *Burroughs Corporation*.

Hereby enters this disclaimer to claims 1 and 2 of said patent.

[*Official Gazette August 14, 1962.*]